United States Patent
Ran et al.

(10) Patent No.: US 10,164,912 B2
(45) Date of Patent: Dec. 25, 2018

(54) ETHERNET AUTO-NEGOTIATION WITH PARALLEL DETECT FOR 10G DAC OR OTHER NON-AUTO-NEGOTIATED MODES

(71) Applicant: Intel Corporation, Santa Clara, CA (US)

(72) Inventors: Adee O. Ran, Maayan Baruch (IL); David L. Chalupsky, Banks, OR (US); Kevan A. Lillie, Chandler, AZ (US); Richard I. Mellitz, Prosperity, SC (US); Kent C. Lusted, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 15/218,681

(22) Filed: Jul. 25, 2016

(65) Prior Publication Data

US 2018/0026917 A1      Jan. 25, 2018

(51) Int. Cl.
*H04L 12/935*      (2013.01)

(52) U.S. Cl.
CPC .............................. *H04L 49/3054* (2013.01)

(58) Field of Classification Search
CPC ......... H04L 69/12; H04L 69/14; H04L 69/18; H04L 69/24; H04L 69/26; H04L 69/28; H04L 69/324; H04L 41/0806; H04L 41/0809; H04L 41/0816; H04L 41/0866; H04L 41/0869; H04L 41/0873; H04L 41/0883; H04L 41/0886; H04L 41/0889; H04L 43/0811; H04L 1/0023; H04L 1/0035; H04L 1/24; H04L 29/08018;

(Continued)

(56) References Cited

U.S. PATENT DOCUMENTS 7,720,135 B2 *   5/2010  Booth ................. H04L 12/4625
                                                  370/296
8,402,120 B1 *   3/2013  Perkinson .............. H04L 67/16
                                                  370/254

(Continued)

OTHER PUBLICATIONS

International Search Report and Written Opinion received for PCT Patent Application No. PCT/US2017/038817, dated Oct. 12, 2017, 14 pages.

*Primary Examiner* — Greg C Bengzon
(74) *Attorney, Agent, or Firm* — Law Office of R. Alan Burnett, P.S.

(57) ABSTRACT

Methods and apparatus for Ethernet auto-negotiation (AN) with parallel detect for 10G DAC or other non-auto-negotiated modes. AN base pages are transmitted from an Ethernet apparatus to advertise the ability to support at least one Institute of Electrical and Electronics Engineers (IEEE) 802.3 Ethernet specification supporting AN. A receiver and associated processing circuitry is configured to perform two detection modes in parallel, including a first detection mode that looks for a valid signal transmitted from an Ethernet link peer that does not support AN and a second detection mode looking for AN pages from an IEEE 802.3 Ethernet link peer that supports AN. If the link peer does not support AN, an Ethernet link is set up to use signaling in accordance with the Ethernet specification that does not support AN. If the link peer supports AN, an Ethernet link is set up using a corresponding IEEE 802.3 Ethernet link supporting AN. Supported non-AN Ethernet links include 10G DAC links.

16 Claims, 6 Drawing Sheets

(58) Field of Classification Search
CPC ........... H04L 29/08027; H04L 49/3054; H04L 41/0853; H04L 43/10; H04L 43/12; H04L 43/50; H04L 65/1003; H04B 10/0799; H04B 10/077; H04B 10/0779; H04Q 2011/0079

See application file for complete search history.

(56) References Cited

U.S. PATENT DOCUMENTS

| | | | |
|---|---|---|---|
| 9,699,033 B2* | 7/2017 | Robitaille | H04L 41/0886 |
| 2005/0198260 A1* | 9/2005 | Shahdadpuri | H04L 69/24 709/224 |
| 2010/0189168 A1 | 7/2010 | Booth et al. | |
| 2010/0229067 A1* | 9/2010 | Ganga | H03M 5/145 714/752 |
| 2010/0229071 A1* | 9/2010 | Ganga | H03M 13/05 714/776 |
| 2011/0072151 A1* | 3/2011 | Sharma | H04L 69/18 709/233 |
| 2014/0071855 A1* | 3/2014 | Robitaille | H04L 5/1438 370/255 |
| 2014/0185989 A1* | 7/2014 | Woodruff | G02B 6/36 385/77 |
| 2014/0223265 A1* | 8/2014 | Lusted | H04L 1/004 714/776 |
| 2015/0256400 A1* | 9/2015 | Venkatesan | H04L 41/0886 370/255 |
| 2016/0099795 A1* | 4/2016 | Lusted | G06F 11/10 714/776 |
| 2016/0100234 A1* | 4/2016 | Adhikesavalu | H04Q 11/0003 398/45 |
| 2016/0164736 A1* | 6/2016 | Lusted | H04L 41/0886 370/254 |
| 2016/0191314 A1* | 6/2016 | Russell | H04L 41/22 709/221 |
| 2017/0222379 A1* | 8/2017 | Leigh | H01R 25/162 |
| 2017/0244817 A1* | 8/2017 | Zhang | H04L 69/24 |
| 2017/0272324 A1* | 9/2017 | Robitaille | H04L 5/1438 |

* cited by examiner

| Bit | Technology |
|---|---|
| A0 | 1000BASE-KX |
| A1 | 10GBASE-KX4 |
| A2 | 10GBASE-KR |
| A3 | 40GBASE-KR4 |
| A4 | 40GBASE-CR4 |
| A5 | 100GBASE-CR10 |
| A6 | 100GBASE-KP4 |
| A7 | 100GBASE-KR4 |
| A8 | 100GBASE-CR4 |
| <u>A9</u> | <u>25GBASE-KR-S or 25GBASE-CR-S</u> |
| <u>A10</u> | <u>25GBASE-KR or 25GBASE-CR</u> |
| ~~A9 Through A24~~ <u>A11 Through A22</u> | Reserved for Future Technology |

ETHERNET AUTO-NEGOTIATION WITH PARALLEL DETECT FOR 10G DAC OR OTHER NON-AUTO-NEGOTIATED MODES

BACKGROUND INFORMATION

As computer processing has moved from local compute resources, such as a desktop or laptop computer system, to remote distributed compute resources, such as cloud-host services and the like, data transfer speeds across networks has become increasingly important. To this end, high-speed network links are critical for data center and high performance computing (HPC). One of the primary network technologies in data centers and HPC environments is high-speed Ethernet.

The original Ethernet standard was specified in Institute of Electrical and Electronics Engineers (IEEE) 802.3 in 1983. Subsequently, the vast majority of Ethernet standards have been developed and specified under an IEEE 802.3-based committee. The IEEE 802.3 Ethernet standard defines several data rates that can be used when connecting two systems. For the backplane and copper cables media, there is an auto-negotiation (AN) protocol defined in clause 73 of the standard (803.2-2012, Section Five), which enables selecting a port type, and other features such as forward error correction (FEC), based on advertised capabilities of both sides. Network management can be used to program what capabilities are advertised for a port, and thus control the data rate that will be selected by AN. For some rates, a link training period is included in the AN process, which enables improving received signal quality and operating over more challenging media (e.g. longer cables).

In contrast, the implementation of Ethernet operation over copper cables at 10 Gigabit per second (Gb/s) was defined outside of IEEE 802.3, in the Small Form Factor (SFF)-8418 committee, and labeled (Small Form Factor Pluggable) SFP+ direct attach or 10GSFP+Cu, also known as 10G Direct Attach Cable or 10G DAC. The form factor and electrical interface for 10G DAC are specified by a multi-source agreement, is widely-used in today's data centers and is envisioned to continue to see substantially usage in the future. In contrast to the 802.3 standard, 10G DAC does not support either auto-negotiation or FEC, nor is link training supported.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified:

FIG. 2 is a table showing Technology Ability Field bits, including an extension to table 73-4 in clause 73 to further support 25 GBASE-KR-S or 25 GBASE-CR-S and 25 GBASE-KR or 25 GBASE-CR IEEE 802.3 Ethernet standards;

FIG. 3 is diagram illustrating a link codeword Base Page in accordance with FIG. 73-6 of IEEE 802.3-2012 clause 73;

DETAILED DESCRIPTION

Figure 1:
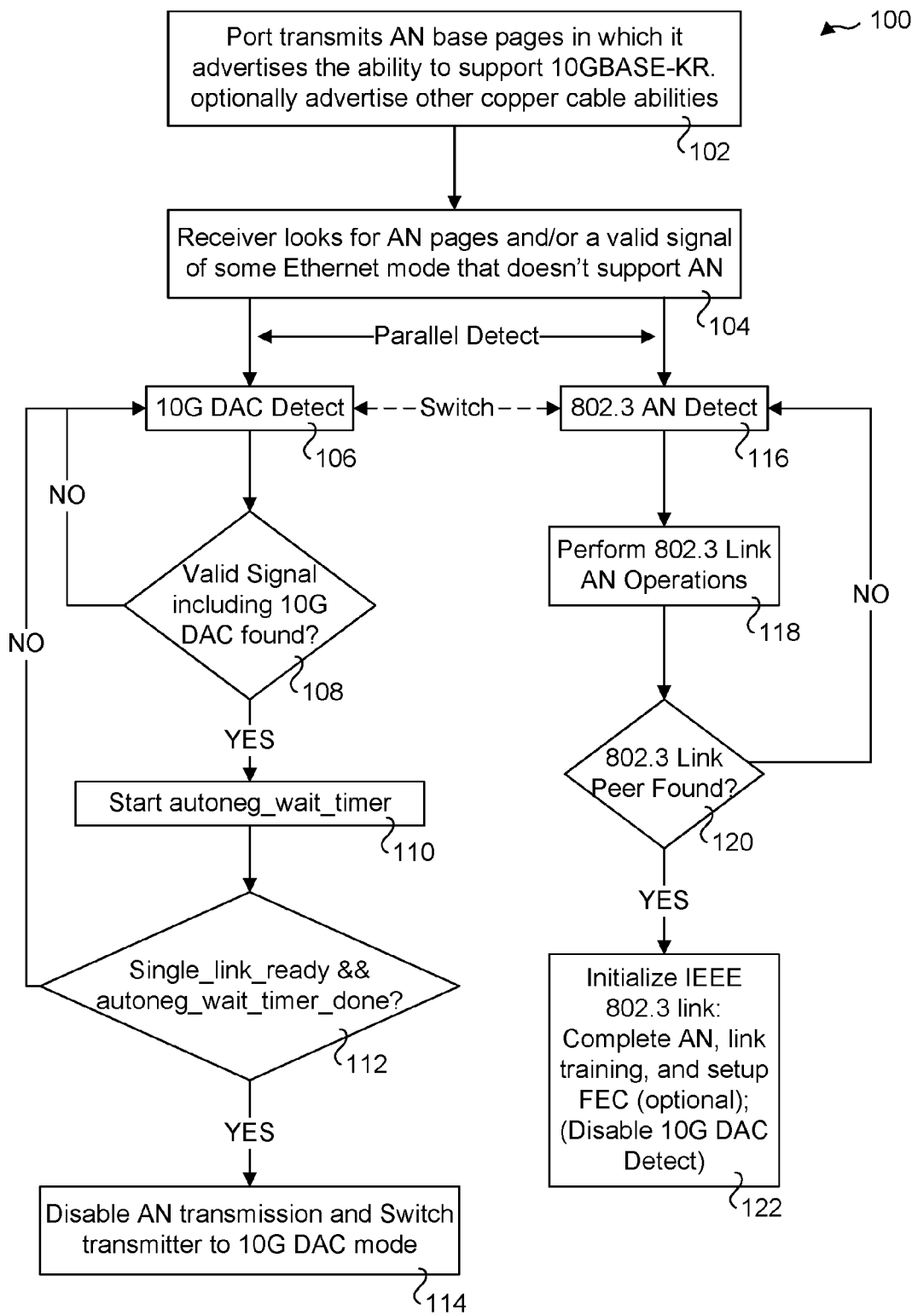
FIG. 1 is a flowchart illustrating operations and logic for implemented parallel detection of 10G DAC signals and 10 GBASE-KR (and/or other IEEE 802.3 Ethernet standards supporting AN) signals, according to one embodiment.

Embodiments of methods and apparatus for Ethernet auto-negotiation with parallel detect for 10G DAC or other non-auto-negotiated modes are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

Ethernet has defined port types for 40 Gb/s and 100 Gb/s data rates separately for the backplane and copper cable media (for 40G, 40 GBASE-KR4 defined in clause 84 for backplane, and 40 GBASE-CR4 defined in clause 85 for copper cables; for 100G, 100 GBASE-KR4 defined in clause 93 for backplane, and 100 GBASE-CR4 defined in clause 92 for copper cables). For these rates, capabilities are advertised in AN separately per medium. Also, the 802.3by task force is defining new port types for 25 Gb/s data rates (25 GBASE-KR defined in clause 111 for backplane, 25 GBASE-CR defined in clause 110 for copper cables). For the 25G rate, backplane and copper cable are advertised as a single capability. In addition, Ethernet has port types for backplane in lower data rates, 10 Gb/s (10 GBASE-KR) and 1 Gb/s (1000 BASE-KX), which can also be advertised in AN, but there is no designated port type for copper cable for these rates.

In backplane systems, auto-negotiation can be used to downgrade a link to a lower data rate if desired (assuming the partner supports the lower rate), for various reasons, e.g. power saving or due to poor signal or media quality. Thus, a port supporting 40 GBASE-KR4 may be downgraded to run 10 GBASE-KR (using only one out of four lanes), or a port supporting 25 GBASE-KR link may be downgraded to run 10 GBASE-KR or 1000 BASE-KX (using lower signaling rates). Using AN provides an interoperable way of downgrading and upgrading a port and re-establishing the link with the partner. However, currently 10G DAC mode cannot be chosen for downgrade, since it does not include AN, and the capability cannot be advertised.

The 10 GBASE-KR port defined for backplanes can also operate over copper cables, which would provide AN, link training and optional FEC over this medium, and also extend the downgrade/upgrade mode selection. However, the problem is that a port that uses 10 GBASE-KR over copper cables cannot interoperate with a port that is configured as 10G DAC. Due to the large installed base of 10G DAC, this may slow adoption of 10 GBASE-KR over copper cables, and thus prevent users from the additional capabilities offered by this feature. The current "solution" is to program both sides of the link to use 10G DAC instead of Ethernet AN. This requires controlling both sides of the link, which is more complex, and sometimes not feasible.

The existing AN protocol requires a device to send a designated signal (AN pages) on its transmitter, while on its receiver it looks for a partner that sends a similar signal. The AN page transmission continues until an AN-capable partner is detected.

AN also defines a "parallel detection" mode for interoperating with legacy devices that do not support AN (and thus do not transmit AN pages), but have a fixed signaling rate of 1.25 Gb/s or 3.125 Gb/s (1000 BASE-KX or 10 GBASE-KX4 respectively). A device that performs parallel detection transmits AN pages but, in addition to looking for AN pages, also looks for a valid 1000 BASE-KX or 10 GBASE-KX4 signal. If any of these signals is detected, the device stops transmitting AN pages and instead switches directly to the detected mode. The partner (legacy device that does not use AN) will identify the new mode which matches its own mode and a link will be established.

Under aspects of the embodiments described herein, a similar "parallel detection" method is disclosed to detect 10G DAC signaling and thus enable linking and interoperating with 10G DAC devices. The scheme supports use of 10 GBASE-KR with AN for copper cables instead of 10G DAC mode, which will enable link training, optional FEC, and automatic rate changes on copper cable media. In addition, the embodiments enablesmooth upgrade of existing networks, which may include 10G DAC ports that cannot be configured as 10 GBASE-KR.

FIG. 1 shows a flowchart 100 illustrating operations and logic for implemented parallel detection of 10G DAC signals and 10 GBASE-KR (and/or other IEEE 802.3 Ethernet standards supporting AN) signals, according to one embodiment. The process begins in a block 102, wherein a port transmits AN base pages in which it advertises 10 GBASE-KR. In addition it may advertise other copper cable abilities (such as but not limited to 25 GBASE-CR, 25 GBASE-KR, and 40 GBASE-KR).

Figure 3:
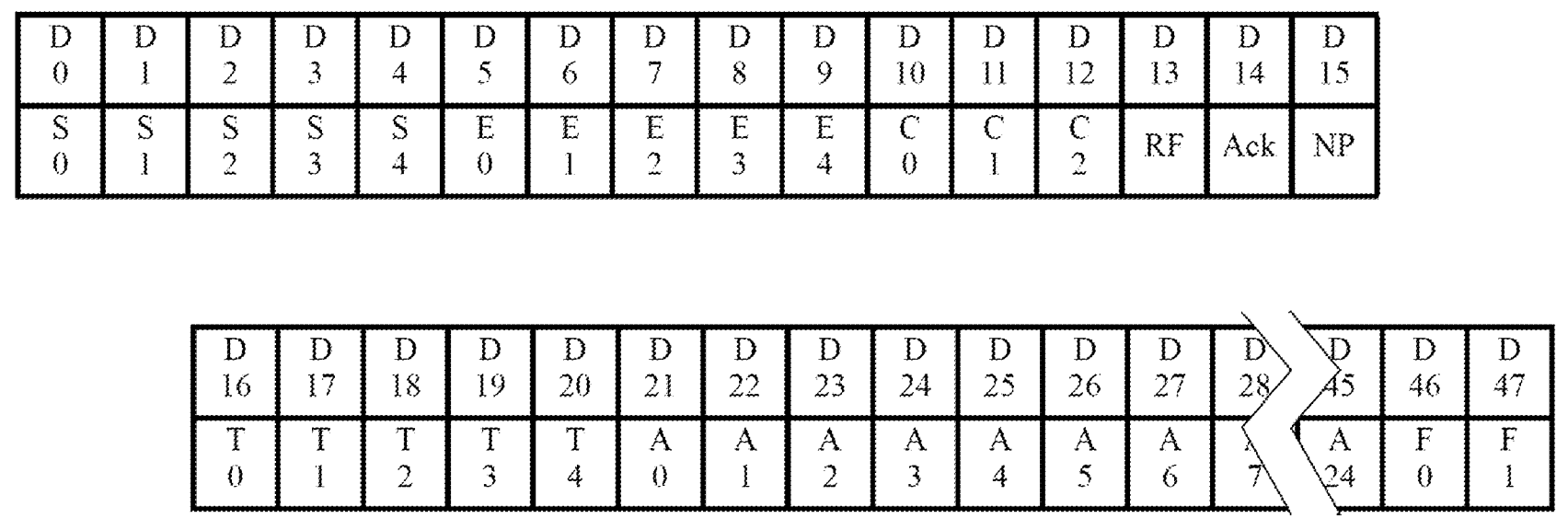

Advertising is done by setting Technology Ability Field bits, as shown in the table 200 of FIG. 2 (which is an augmented version of table 73-4 in clause 73), and FIG. 3 (which is a reproduction of FIG. 73-6 of clause 73). The base link codeword (Base Page) transmitted within a DME page conveys the encoding shown in FIG. 3. The Auto-Negotiation function supports additional pages using the Next Page function. Encoding for the link codeword(s) used in the Next Page exchange are defined in 802.3-2012 clause 73.7.7. In a DME page, D0 shall be the first bit transmitted. D[4:0] contains the Selector Field. D[9:5] contains the Echoed Nonce field. D[12:10] contains capability bits to advertise capabilities not related to the PHY. C[1:0] is used to advertise pause capability. The remaining capability bit C[2] is reserved. D[15:13] contains the RF, Ack, and NP bits. These bits shall function as specified in 28.2.1.2. D[20:16] contains the Transmitted Nonce field. D[45:21] contains the Technology Ability Field. D[47:46] contains FEC capability (see clause 73.6.5).

Technology Ability Field (A[24:0]) is a 25-bit wide field containing information indicating supported technologies specific to the selector field value when used with the Auto-Negotiation for Backplane Ethernet. These bits are mapped to individual technologies such that abilities are advertised in parallel for a single selector field value. The current Technology Ability Field encoding for the IEEE 802.3 selector with Auto-Negotiation for Backplane Ethernet is described in Table 73-4.

As shown in FIG. 2, two additional Technology Ability Field bits have been defined. Setting bit A9 advertises the ability to support either 25 GBASE-KR-S or 25 GBASE-CR-S, while setting bit A10 advertises the ability to support either 25 GBASE-KR or 25 GBASE-CR.

Figure 4A:
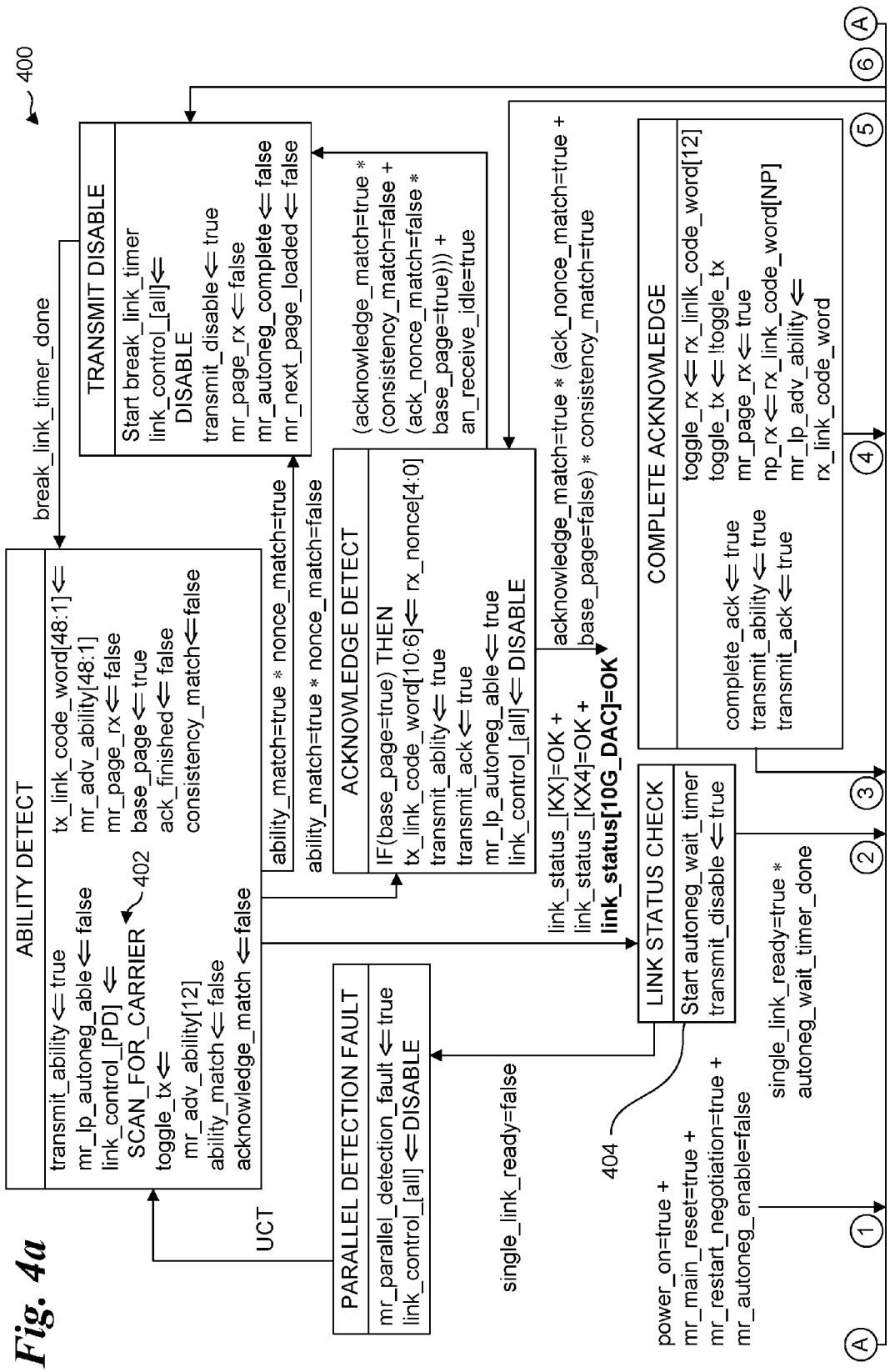
FIGS. 4a and 4b show respective portions of an AN arbitration state diagram configured to support parallel detection of IEEE 802.3 Ethernet signals supporting AN and Ethernet signals in accordance with Ethernet standards that do not support AN, including 10G DAC, according to one embodiment.
Figure 4B:
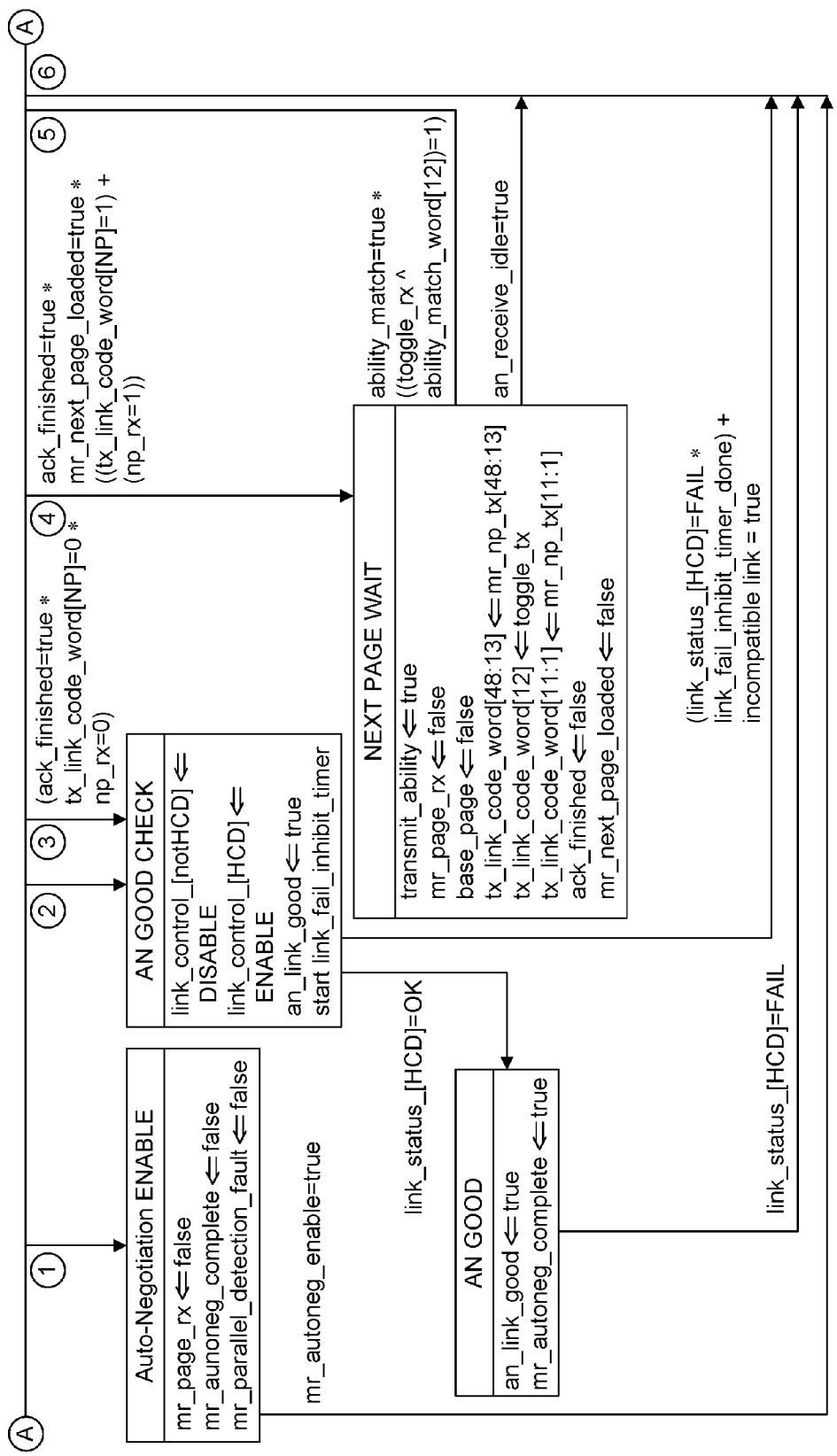

Returning to FIG. 1, in a block 104, on the receiver, the device looks for AN pages and/or a valid signal of some supported Ethernet mode that does not support AN; this is marked as "link_control_[PD]←SCAN_FOR_CARRIER" 402 in the first portion of AN arbitration state diagram 400 in FIG. 4a, wherein "PD" stands for "Parallel Detection." The intent is that all modes that are supported for parallel detection would be enabled (SCAN_FOR_CARRIER). Under different embodiments of the parallel detection modes described herein, processing of received signals looking for AN pages or valid signals may be performed simultaneously, or may be performed by rapidly switching detection modes, as shown in the dashed double-headed arrow labeled "switch" in FIG. 1.

One embodiment extends the PD modes defined in arbitration state diagram in FIG. 73-11 of clause 73 to include a 10G DAC detection mode; in terms of clause 73, this would conceptually be a redefinition of "PD" as follows in TABLE 1:

TABLE 1

| | |
|---|---|
| PD | Represents all of the following that are present: 1000BASE-KD PMD; 10GBASE-KX4 (or 10GBASE-CX4) PMD; and 10G DAC PMD |

As illustrated in FIG. 1, operations relating to detection of a 10G DAC and detection of an 802.3 link peer are respectively shown in the left-hand and right-hand portions of flowchart 100 below block 104. As further indicated, these operations are performed in parallel, either simultaneously or via rapid switching between detection modes.

Operations in a block 106 and a decision block 108 relating to 10G DAC detection are performed in loopwise manner, looking for a valid signal including a 10G DAC. As shown in the portion of arbitration state diagram 400 in FIG. 4a, detection of a valid 10G DAC signal results in a link_state[10G_DAC]=OK state, which also coincides with a result of YES for decision block 108. In response, the arbitration 400 state proceeds to a LINK STATUS CHECK 404 in FIG. 4a, which includes Start autoneg_wait_timer 404, which also is depicted in a block 110 in flowchart 100.

In a decision block 112, a determination is made to whether both single_link_ready state and autoneg_wait_time_done are true, indicating that a valid signal is present during the wait time defined for the auto-negotiation wait timer. If the answer to decision block 112 is YES, the logic proceeds to a block 114 in which transmission of the AN pages is disabled and the transmitter is switched to the 10G DAC mode.

If the answer to either decision block 108 or decision block 112 is NO, the logic loops back to block 106. If the mode detection operations are performed simultaneously, the 10G DAC detection process is repeated in a continuous manner. If parallel detection is performed by switching between detection modes, once returning to block 106 the 10G DAC detection process can either be repeated or the logic can switch to performing 802.3 AN detection.

During 802.3 AN detection, the receiver is looking for AN pages that are transmitted by an IEEE 802.3 link peer supporting 10 GBASE-KR or other 802.3 high-speed Ethernet links implemented over copper cables that support AN. The process includes operations in blocks 116 and 118, wherein 802.3 link AN operations are performed in a in accordance with arbitration state diagram 400. In a decision block 120, a determination is made to whether an IEEE 802.3 Ethernet link peer supporting AN is found. If the answer is YES, the logic proceeds to a block 122, wherein an IEEE 802.3 Ethernet link is initialized by completing AN operations, link training is performed, and optional FEC support is configured. In addition, if simultaneous detection is being performed, the 10G DAC detection mode is disabled. If the answer to decision block 120 is NO, the logic loops back to block 116, followed by either repeating the 802.3 AN detection operations or switching to the 10G DAC detection operations, depending on the parallel detection mode is performed simultaneously or switched.

It is noted that the criteria for deciding that a valid 10G DAC signal is found are implementation dependent. A receiver may, for example, use frequency lock indication, PCS/scrambler lock indication, signal quality or eye-opening measurement, or a combination of the above. The receiver may have to be configured differently to enable detection of AN pages, KX, KX4, and 10G DAC modes. This can be solved by having the receiver switch periodically between these modes until a valid signal is detected. Variations on this scheme are possible and are implementation dependent.

In a similar way to the described for 10G DAC above, other modes can also be added. For example, a device may also be able to parallel-detect 2.5G Ethernet and 5G Ethernet (which are currently being defined in 802.3cb), may detect other types of links that do not use auto-negotiation, or any other signaling method.

Figure 5:
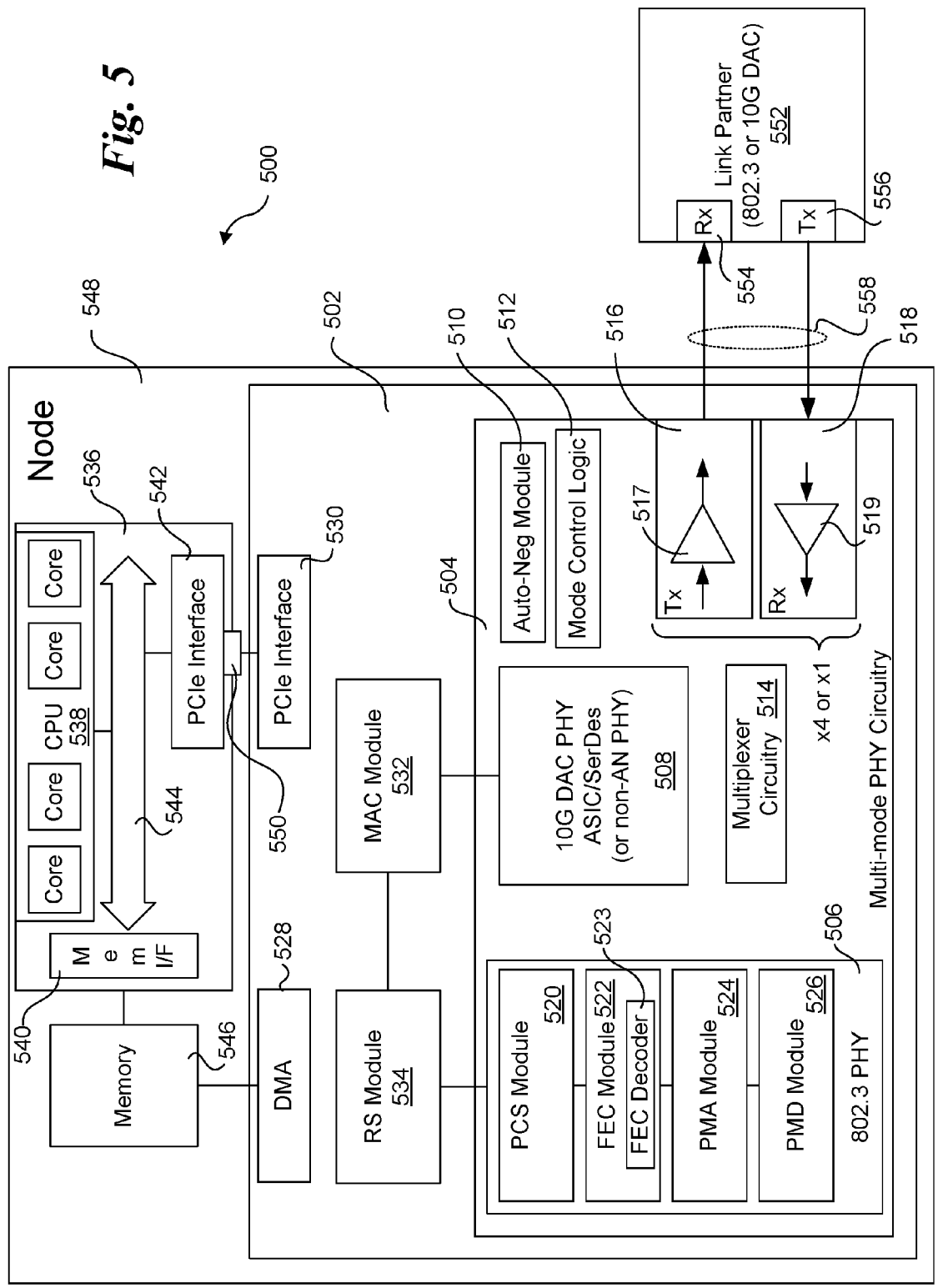
FIG. 5 is a schematic diagram illustrating an architecture for a network node employing a network chip configured to implement prevention of false packet acceptance in accordance with the embodiments disclosed herein.

FIG. 5 shows an architecture 500 for a compute node employing a multi-mode network chip 502 configured to implement aspects of the embodiments disclosed herein. The compute node is illustrative of various host platforms in which a multiple-mode network chip or NIC may be installed. Network chip 502 comprises multi-mode PHY circuitry 504 including an 802.3 PHY block 506, a 10G DAC PHY block 508, an auto-negotiation module 510, mode control logic 512, multiplexer circuitry 514, a transmitter (Tx) port 516 including transmitter circuitry 517, and a receiver (Rx) port 518 including receiver circuitry 519. The transmitter and receiver circuitry may support a single lane (x1) or four lanes (x4) that may be reconfigured to operate as a single lane when connected to a link partner that only supports a single lane Ethernet link.

802.3 PHY block 506 is illustrative of a PHY circuit block configured to support any of the 802.3 high-speed Ethernet technologies described herein, including 10 GBASE-KR4, 25 GBASE-KR4, and 40 GBASE-KR4. 802.3 PHY block 506 includes a Physical Coding Sublayer (PCS) module 520, an FEC module 522 including an FEC decoder 523, a Physical Media Attachment (PMA) module 524, and a Physical Media Dependent (PMD) module 526. 10G DAC PHY block 508 is configured to implement the 10G DAC physical interface circuitry and logic in accordance with SFF-8418. In one embodiment 10G DAC PHY block 508 is implemented as an Application Specific Integrated Circuit including serializer and deserializer circuitry (ASIC/SerDes), as described in SFF-8418. As further illustrated, a PHY block that does not support auto-negotiation (i.e., a non-AN PHY block) may be implemented in place of 10G DAC PHY block 508, along with appropriate circuitry to implement the associated non-AN Ethernet link (not shown).

Network chip 502 further includes a DMA (Direct Memory Access) interface 528, a Peripheral Component Interconnect Express (PCIe) interface 530, a MAC module 532 and a Reconciliation Sublayer (RS) module 534. Compute node 500 also comprises a System on a Chip (SoC) 536 including a Central Processing Unit (CPU) 538 having one or more processor cores, coupled to a memory interface 540 and a PCIe interface 542 via an interconnect 544. Memory interface 540 is further depicted as being coupled to memory 546. Under one configuration, network chip 502, SoC 536 and memory 546 will be mounted on or otherwise operatively coupled to a circuit board 548 that includes wiring traces for coupling these components in communication, as depicted by single lines connecting DMA 528 to memory 546 and PCIe interface 530 to PCIe interface 542 at a PCIe port 550.

In one embodiment, MAC module 532, and RS module 534 are respectively configured to implement aspects of the MAC layer operations and reconciliation sub-layer operations as defined for one or more 802.3 high-speed Ethernet links, including 10 GBASE-KR4, 25 GBASE-KR4, and 40 GBASE-KR4. MAC module 532 is also configured to support MAC layer operations for a 10G DAC link, and is configured to switch between one or more 802.3 Ethernet links and the 10G DAC link.

During link initialization, auto-negotiation module 510 is implemented for auto-negotiation of link speed and capabilities for an 802.3 Ethernet link. As described above, the AN format consists of a base-page, which is the first set of formatted information exchanged with the link partner, as depicted by a link partner 552 including a receiver port 554 and a transmitter port 556. As shown, compute node 500 and link partner 552 are linked in communication via an Ethernet link 558 implemented using a copper cable.

Mode control logic 512 is configured to implement the operations and logic illustrated in flowchart 100 of FIG. 1 described above. The includes controlling multiplexer circuitry 514, which is use to selectively couple the transmitter and receiver circuitry 517 and 519 to 802.3 PHY block 506 or 10G DAC PHY block 508. In one embodiment, multiplexer circuitry 514 is configured to simultaneously coupled signals received by receiver circuitry 517 to each of 802.3 PHY block 506 and 10G DAC PHY block 508.

In addition to implementing the circuit components and modules shown in FIG. 5 in a network chip, such as a Network Interface Controller (NIC) chip, various components and modules may be implemented as discreet components mounted to a circuit board or the like, or otherwise implemented using multi-component packaging. For example, 802.3 PHY block 506 and 10G DAC PHY block 508 might be implemented using separate chips. In addition to being implemented in a compute node, network chip 502, or a chip or multi-component module with similar functionality, may also be implemented in a network switch including multiple ports.

In addition to Further aspects of the subject matter described herein are set out in the following numbered clauses:

1. A method performed by an Ethernet apparatus including a transmitter and receiver, comprising:
transmitting auto-negotiation (AN) base pages via the transmitter to an Ethernet link peer to advertise the Ethernet apparatus has the ability to support at least one Institute of Electrical and Electronics Engineers (IEEE) 802.3 Ethernet specification supporting AN;
detecting, at the receiver using a first detection mode, for a valid signal transmitted from the Ethernet link peer that does not support auto-negotiation (AN); and
detecting, at the receiver using a second detection mode, for AN pages transmitted from the Ethernet link peer using an IEEE 802.3 Ethernet link specification supporting AN.

2. The method of clause 1, wherein detecting for the valid signal and for the AN pages is performed in parallel by switching between the first and second detection modes.

3. The method of clause 1, wherein detecting for the valid signal and for the AN pages is performed in parallel by simultaneously processing signals received at the receiver that are transmitted from one of an Ethernet link peer that does not support AN and a IEEE 802.3 Ethernet link peer supporting AN.

4. The method of any of the preceding clauses, wherein the Ethernet link that does not support AN is a 10 Gigabit per second Direct Attach Cable (10G DAC) link.

5. The method any of the preceding clauses, wherein the Ethernet link that supports AN is one of a 10 GBASE-KR link, a 25 GBASE-KR link, and a 40 GBASE-KR link.

6. The method any of the preceding clauses, wherein the first detection mode comprises:
detecting whether a signal received at the receiver is a valid signal transmitted from an Ethernet link peer that does not support AN;
in response to detecting the signal received at the receiver is a valid signal transmitted from an Ethernet link peer that does not support AN, starting an auto-negotiation wait timer; and
detecting whether both a single_link_ready state and an autoneg_wait_timer_done are true.

7. The method of clause 6, wherein the Ethernet link that does not support AN is a 10 Gigabit per second Direct Attach Cable (10G DAC) link, further comprising:
in response to detecting that both the single_link_ready state and the autoneg_wait_timer_done are true,
disabling AN transmission and switching the transmitter to a 10G DAC mode.

8. The method of clause 6, further comprising:
in response to at least one of,
detecting the signal received at the receiver is not a valid signal transmitted from an Ethernet link peer that does not support AN; and
detecting that at least one of the single_link_ready state and the autoneg_wait_timer_done are not true,
switching from the first detection mode to the second detection mode.

9. The method of any of the preceding clauses, wherein the second detection mode comprises:
detecting, via AN pages transmitted from an Ethernet link peer, that the Ethernet link peer supports one or more IEEE 802.3 Ethernet specifications supported by the Ethernet apparatus; and
completing auto-negotiation and link training with the Ethernet link peer to initialize link operations with the Ethernet link peer using one of the one or more IEEE 802.3 Ethernet link specifications supported by the Ethernet link peer and the Ethernet apparatus.

10. The method of clause 8 further comprising disabling the first detection mode.

11. An Ethernet apparatus comprising:
a receiver, configured to receive Ethernet signals in accordance with at least one Institute of Electrical and Electronics Engineers (IEEE) 802.3 Ethernet specification supporting auto-negotiation (AN) and Ethernet signals in accordance with at least one Ethernet specification that does not support AN.
a transmitter, configured to transmit Ethernet signals in accordance with the at least one IEEE 802.3 Ethernet specification supporting AN and Ethernet signals in accordance with the at least one Ethernet specification that does not support AN;
a first block of physical layer (PHY) circuitry configured to perform PHY processing of Ethernet signals in accordance with the at least one IEEE 802.3 Ethernet specification supporting AN;
a second block of PHY circuitry configured to perform PHY processing of Ethernet signals in accordance with the at least one Ethernet specification that does not support AN; and
an auto-negotiation module, comprising circuitry and logic configured to perform AN operations in accordance with the at least one IEEE 802.3 Ethernet specification supporting AN,
wherein the Ethernet apparatus is further configured to,
transmit AN base pages via the transmitter to advertise the Ethernet apparatus has the ability to support at least one IEEE 802.3 Ethernet specification supporting AN;
detect, at the receiver using a first detection mode, for a valid signal transmitted from an Ethernet link peer that does not support auto-negotiation (AN); and
detect, at the receiver using a second detection mode, for AN pages transmitted from an IEEE 802.3 Ethernet link peer using an IEEE 802.3 Ethernet link technology supporting AN.

12. The Ethernet apparatus of clause 11, wherein the first and second detection modes are performed in parallel by switching between the first and second detection modes.

13. The Ethernet apparatus of clause 11, wherein the first and second detection modes are performed in parallel by simultaneously processing received Ethernet signals using the first and second blocks of PHY circuitry.

14. The Ethernet apparatus of any of clauses 11-13, wherein the Ethernet link peer that does not support AN is a 10 Gigabit per second Direct Attach Cable (10G DAC) Ethernet link peer.

15. The Ethernet apparatus of any of clauses 11-14, wherein the Ethernet link peer that supports an IEEE 802.3 Ethernet specification supporting AN is one of a 10 GBASE-KR, a 25 GBASE-KR, and a 40 GBASE-KR Ethernet link peer.

16. The Ethernet apparatus of any of clauses 11-15, wherein the first detection mode comprises:
 detecting whether a signal received at the receiver is a valid signal transmitted from an Ethernet link peer that does not support AN;
 in response to detecting the signal received at the receiver is a valid signal transmitted from an Ethernet link peer that does not support AN, starting an auto-negotiation wait timer; and
 detecting whether both a single_link_ready state and an autoneg_wait_timer_done are true.

17. The Ethernet apparatus of clause 16, wherein the Ethernet link peer that does not support AN is a 10 Gigabit per second Direct Attach Cable (10G DAC) Ethernet link peer, and wherein the first detection mode further comprises:
 in response to detecting that both the single_link_ready state and the autoneg_wait_timer_done are true,
 disabling transmission of the AN base pages and switching the transmitter to a 10G DAC mode.

18. The Ethernet apparatus of any of clauses 11-17, wherein the first detection mode further comprises:
 in response to at least one of,
 detecting the signal received at the receiver is not a valid signal transmitted from an Ethernet link peer that does not support AN; and
 detecting that at least one of the single_link_ready state and the autoneg_wait_timer_done are not true,
 switching from the first detection mode to the second detection mode.

19. The Ethernet apparatus of any of clauses 11-18, wherein the second detection mode comprises:
 detecting, via AN pages transmitted from an IEEE 802.3 Ethernet link peer, that the Ethernet link peer supports one or more 802.3 Ethernet link types supported by the Ethernet apparatus; and
 completing auto-negotiation and link training with the IEEE 802.3 Ethernet link peer to initialize link operations with the IEEE 802.3 Ethernet link peer using one of the one or more 802.3 Ethernet link types supported by the IEEE 802.3 Ethernet link peer and the Ethernet apparatus.

20. A multi-mode Ethernet Network Interface Controller (NIC) comprising:
 a receiver, configured to receive 10 Gigabit per second (10G) Ethernet signals;
 a transmitter, configured to transmit 10G Ethernet signals;
 a first physical layer (PHY) circuit block, selectively coupled to the receiver and transmitter and configured to process Institute of Electrical and Electronics Engineers (IEEE) 802.3 10 GBASE-KR Ethernet signals;
 a second PHY circuit block, selectively coupled to the receiver and transmitters and configured to process 10G Direct Attachment Cable (DAC) Ethernet signals,
 wherein the multi-mode Ethernet NIC is further configured, when coupled to an Ethernet port to which an Ethernet link peer is communicatively coupled via a copper cable, to detect whether the Ethernet link peer is transmitting 10G DAC Ethernet signals or 10 GBASE-KR Ethernet signals.

21. The multi-mode Ethernet NIC of clause 20, further configured to:
 transmit auto-negotiation (AN) base pages via the transmitter to advertise the multi-mode Ethernet NIC has the ability to support 10 GBASE-KR Ethernet signals supporting AN;
 detect, at the receiver using a first detection mode, for a valid signal transmitted from an Ethernet link peer transmitting 10G DAC Ethernet signals; and
 detect, at the receiver using a second detection mode, for AN pages transmitted from a 10 GBASE-KR Ethernet link peer.

22. The multi-mode Ethernet NIC of clause 21, wherein the first and second detection modes are performed in parallel by switching between the first and second detection modes.

23. The multi-mode Ethernet NIC of clause 21 or 22, wherein the first detection mode comprises:
 in response to detecting the Ethernet signal received at the receiver is a valid signal transmitted from a 10G DAC Ethernet link peer, starting an auto-negotiation wait timer; and
 detecting whether both a single_link_ready state and an autoneg_wait_timer_done are true.

24. The multi-mode Ethernet NIC of clause 23, wherein the first detection mode further comprises:
 in response to detecting that both the single_link_ready state and the autoneg_wait_timer_done are true,
 disabling transmission of the AN base pages and switching the transmitter to a 10G DAC mode.

25. The multi-mode Ethernet NIC of any of clauses 21-24, wherein the second detection mode comprises:
 detecting, via AN pages transmitted from a 10 GBASE-KR Ethernet link peer, that the Ethernet link peer supports one or more 802.3 Ethernet link types supported by the multi-mode Ethernet NIC; and
 completing auto-negotiation and link training with the 10 GBASE-KR Ethernet link peer to initialize link operations with the 10 GBASE-KR Ethernet link peer using 10 GBASE-KR Ethernet signaling.

25. The multi-mode Ethernet NIC of any of clauses 21-24, wherein the second detection mode comprises:
 detecting, via AN pages transmitted from a 10 GBASE-KR Ethernet link peer, that the Ethernet link peer supports one or more 802.3 Ethernet link types supported by the multi-mode Ethernet NIC; and
 completing auto-negotiation and link training with the 10 GBASE-KR Ethernet link peer to initialize link operations with the 10 GBASE-KR Ethernet link peer using 10 GBASE-KR Ethernet signaling.

26. The multi-mode Ethernet NIC of any of clauses 21-25, further comprising a Peripheral Component Interconnect Express (PCIe) interface.

27. The multi-mode Ethernet NIC of any of clauses 21-26, further comprising a reconciliation sub-layer (RS) module coupled to the first PHY circuit block and a Media Access Control (MAC) module coupled to the RS module.

28. The multi-mode Ethernet NIC any of clauses 21-27, wherein the multi-mode Ethernet NIC is configured to support Direct Memory Access (DMA) data transfers with memory in a host platform when the multi-mode Ethernet NIC is installed in the host platform.

29. A compute node, comprising:
 a processor, including a memory interface to which memory is coupled; and
 a multi-mode Ethernet Network Interface Controller (NIC), coupled to the processor, including, a receiver, configured to receive 10 Gigabit per second (10G) Ethernet signals;

a transmitter, configured to transmit 10G Ethernet signals;

a first physical layer (PHY) circuit block, selectively coupled to the receiver and transmitter and configured to process Institute of Electrical and Electronics Engineers (IEEE) 802.3 10 GBASE-KR Ethernet signals;

a second PHY circuit block, selectively coupled to the receiver and transmitters and configured to process 10G Direct Attachment Cable (DAC) Ethernet signals, wherein the multi-mode Ethernet NIC is further configured, when coupled to an Ethernet port to which an Ethernet link peer is communicatively coupled via a copper cable, to detect whether the Ethernet link peer is transmitting 10G DAC Ethernet signals or 10 GBASE-KR Ethernet signals.

30. The compute node of clause 29, wherein the multi-mode Ethernet NIC is further configured to:

transmit auto-negotiation (AN) base pages via the transmitter to advertise the multi-mode Ethernet NIC has the ability to support 10 GBASE-KR Ethernet signals supporting AN;

detect, at the receiver using a first detection mode, for a valid signal transmitted from an Ethernet link peer transmitting 10G DAC Ethernet signals; and detect, at the receiver using a second detection mode, for AN pages transmitted from a 10 GBASE-KR Ethernet link peer.

31. The compute node of clause 30, wherein the first and second detection modes are performed in parallel by switching between the first and second detection modes.

32. The compute node of clause 30 or 31, wherein the first detection mode comprises:

in response to detecting the Ethernet signal received at the receiver is a valid signal transmitted from a 10G DAC Ethernet link peer, starting an auto-negotiation wait timer; and detecting whether both a single_link_ready state and an autoneg_wait_timer_done are true.

33. The compute node of clause 32, wherein the first detection mode further comprises:

in response to detecting that both the single_link_ready state and the autoneg_wait_timer_done are true, disabling transmission of the AN base pages and switching the transmitter to a 10G DAC mode.

34. The compute node of clause 32 of any of clauses 30-33, wherein the second detection mode comprises:

detecting, via AN pages transmitted from a 10 GBASE-KR Ethernet link peer, that the Ethernet link peer supports one or more 802.3 Ethernet link types supported by the multi-mode Ethernet NIC; and completing auto-negotiation and link training with the 10 GBASE-KR Ethernet link peer to initialize link operations with the 10 GBASE-KR Ethernet link peer using 10 GBASE-KR Ethernet signaling.

35. A method performed by an Ethernet apparatus including a transmitter and receiver, comprising:

transmitting auto-negotiation (AN) base pages via the transmitter to advertise the multi-mode Ethernet NIC has the ability to support Institute of Electrical and Electronics Engineers (IEEE) 802.3 10 GBASE-KR Ethernet signals supporting AN;

detecting, at the receiver using a first detection mode, for a valid signal transmitted from an Ethernet link peer transmitting 10 Gigabits per second Direct Attachment Cable (10G DAC) Ethernet signals; and detecting, at the receiver using a second detection mode, for AN pages transmitted from a 10 GBASE-KR Ethernet link peer.

36. The method of clause 35, wherein detecting for the valid signal and for the AN pages is performed in parallel by switching between the first and second detection modes.

37. The method of clause 35, wherein detecting for the valid signal and for the AN pages is performed in parallel by simultaneously processing signals received at the receiver that are transmitted from an Ethernet link peer.

38. The method any of clauses 35-37, wherein the Ethernet apparatus further supports at least one of IEEE 802.3 25 GBASE-KR, and 40 GBASE-KR Ethernet signals.

39. The method any of clauses 35-38, wherein the first detection mode comprises:

detecting whether a signal received at the receiver is a valid signal transmitted from an Ethernet link peer that does not support AN;

in response to detecting the signal received at the receiver is a valid signal transmitted from an Ethernet link peer that does not support AN, starting an auto-negotiation wait timer; and detecting whether both a single_link_ready state and an autoneg_wait_timer_done are true.

40. The method of clause 39, further comprising:

in response to detecting that both the single_link_ready state and the autoneg_wait_timer_done are true, disabling AN transmission and switching the transmitter to a 10G DAC mode.

41. The method of clause 39, further comprising:

in response to at least one of, detecting the signal received at the receiver is not a valid 10G DAC Ethernet signal; and detecting that at least one of the single_link_ready state and the autoneg_wait_timer_done are not true, switching from the first detection mode to the second detection mode.

42. The method of any of clauses 35-41, wherein the second detection mode comprises:

detecting, via AN pages transmitted from a 10 GBASE-KR Ethernet link peer, that the Ethernet link peer supports 10 GBASE-KR operations; and completing auto-negotiation and link training with the 10 GBASE-KR Ethernet link peer to initialize link operations with the 10 GBASE-KR Ethernet link peer using 10 GBASE-KR operations.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method performed by an Ethernet apparatus including a transmitter and receiver, comprising:
    transmitting auto-negotiation (AN) base pages via a transmitter to an Ethernet link peer to advertise the Ethernet apparatus has the ability to support at least one Institute of Electrical and Electronics Engineers (IEEE) 802.3 Ethernet specification supporting AN;
    detecting, at the receiver using a first detection mode, for a valid signal transmitted from the Ethernet link peer comprising a valid 10 Gigabit per second Direct Attach Cable (10G DAC) signal;
    detecting, at the receiver using a second detection mode, for AN pages transmitted from the Ethernet link peer using an IEEE 802.3 Ethernet link specification supporting AN;

in response to detecting the signal received at the receiver is a valid 10G DAC signal, starting an auto-negotiation wait timer;
detecting whether both a single_link_ready state and an autoneg₁₃ wait_timer_done are true; and
in response to detecting that both the single_link_ready state and the autoneg_wait_timer_done are true,
disabling AN transmission and switching the transmitter to a 10G DAC mode.

2. The method of claim 1, wherein detecting for the valid signal and for the AN pages is performed in parallel by switching between the first and second detection modes.

3. The method of claim 1, wherein detecting for the valid signal and for the AN pages is performed in parallel by simultaneously processing signals received at the receiver that are transmitted from one of a 10G DAC link peer and a IEEE 802.3 Ethernet link peer supporting AN.

4. The method of claim 1, wherein the Ethernet link peer that supports AN is one of a 10GBASE-KR link peer, a 25GBASE-KR link peer, and a 40GBASE-KR link peer.

5. The method of claim 1, further comprising:
in response to at least one of,
detecting the signal received at the receiver is not a valid signal transmitted from a 10G DAC link peer; and
detecting that at least one of the single_link_ready state and the autoneg_wait_timer_done are not true,
switching from the first detection mode to the second detection mode.

6. The method of claim 1, further comprising:
detecting, via AN pages transmitted from an Ethernet link peer, that the Ethernet link peer supports one or more IEEE 802.3 Ethernet specifications supported by the Ethernet apparatus; and
completing auto-negotiation and link training with the Ethernet link peer to initialize link operations with the Ethernet link peer using one of the one or more IEEE 802.3 Ethernet link specifications supported by the Ethernet link peer and the Ethernet apparatus.

7. The method of claim 5, further comprising disabling the first detection mode.

8. An Ethernet apparatus comprising:
a receiver, configured to receive Ethernet signals in accordance with at least one Institute of Electrical and Electronics Engineers (IEEE) 802.3 Ethernet specification supporting auto-negotiation (AN) and Ethernet signals in accordance with at least one Ethernet specification that does not support AN.
a transmitter, configured to transmit Ethernet signals in accordance with the at least one IEEE 802.3 Ethernet specification supporting AN and Ethernet signals in accordance with the at least one Ethernet specification that does not support AN;
a first block of physical layer (PHY) circuitry configured to perform PHY processing of Ethernet signals in accordance with the at least one IEEE 802.3 Ethernet specification supporting AN; and
a second block of PHY circuitry configured to perform PHY processing of Ethernet signals in accordance with the at least one Ethernet specification that does not support AN;
wherein the Ethernet apparatus is further configured to,
transmit AN base pages via the transmitter to advertise the Ethernet apparatus has the ability to support at least one IEEE 802.3 Ethernet specification supporting AN;

detect, at the receiver using a first detection mode, for a valid signal transmitted from an Ethernet link peer comprising a 10 Gigabit per second Direct Attach Cable (10G DAC) link peer;
detect, at the receiver using a second detection mode, for AN pages transmitted from an IEEE 802.3 Ethernet link peer using an IEEE 802.3 Ethernet link technology supporting AN;
in response to detecting the signal received at the receiver is a valid signal transmitted from a 10G DAC link peer, starting an auto-negotiation wait timer;
detect whether both a single_link_ready state and an autoneg_wait_timer_done are true; and
in response to detecting that both the single_link_ready state and the autoneg_wait_timer_done are true,
disable AN transmission and switch the transmitter to a 10G DAC mode.

9. The Ethernet apparatus of claim 8, wherein the first and second detection modes are performed in parallel by switching between the first and second detection modes.

10. The Ethernet apparatus of claim 8, wherein the first and second detection modes are performed in parallel by simultaneously processing received Ethernet signals using the first and second blocks of PHY circuitry.

11. The Ethernet apparatus of claim 8, wherein the Ethernet link peer that supports an IEEE 802.3 Ethernet specification supporting AN is one of a 10GBASE-KR, a 25GBASE-KR, and a 40GBASE-KR Ethernet link peer.

12. The Ethernet apparatus of claim 8, further configured to:
in response to at least one of,
detecting the signal received at the receiver is not a valid signal transmitted from an Ethernet link peer comprising a 10G DAC link peer; and
detecting that at least one of the single_link_ready state and the autoneg_wait_timer_done are not true,
switch from the first detection mode to the second detection mode.

13. The Ethernet apparatus of claim 8, further configured to:
detect, via AN pages transmitted from an IEEE 802.3 Ethernet link peer, that the Ethernet link peer supports one or more 802.3 Ethernet link types supported by the Ethernet apparatus; and
complete auto-negotiation and link training with the IEEE 802.3 Ethernet link peer to initialize link operations with the IEEE 802.3 Ethernet link peer using one of the one or more 802.3 Ethernet link types supported by the IEEE 802.3 Ethernet link peer and the Ethernet apparatus.

14. A multi-mode Ethernet Network Interface Controller (NIC) comprising:
a receiver, configured to receive 10 Gigabit per second (10G) Ethernet signals;
a transmitter, configured to transmit 10G Ethernet signals;
a first physical layer (PHY) circuit block, selectively coupled to the receiver and transmitter and configured to process Institute of Electrical and Electronics Engineers (IEEE) 802.3 10GBASE-KR Ethernet signals;
a second PHY circuit block, selectively coupled to the receiver and transmitters and configured to process 10G Direct Attachment Cable (DAC) Ethernet signals,
wherein the multi-mode Ethernet NIC is further configured, when coupled to an Ethernet port to which an Ethernet link peer is communicatively coupled via a copper cable, to, transmit auto-negotiation (AN) base pages via the transmitter to advertise the multi-mode Ethernet NIC has the ability to support 10GBASE-KR Ethernet signals supporting AN;

detect, at the receiver using a first detection mode, for a valid signal transmitted from a 10G DAC Ethernet link peer;

detect, at the receiver using a second detection mode, for AN pages transmitted from a 10GBASE-KR Ethernet link peer;

in response to detecting the Ethernet signal received at the receiver is a valid signal transmitted from a 10G DAC Ethernet link peer,
   start an auto-negotiation wait timer and detect whether both a single_link_ready state and an autoneg_wait_timer_done are true; and in response to detecting that both the single_link_ready state and the autoneg_wait_timer_done are true, disable transmission of the AN base pages and switch the transmitter to a 10G DAC mode.

15. The multi-mode Ethernet NIC of claim 14, wherein the first and second detection modes are performed in parallel by switching between the first and second detection modes.

16. The multi-mode Ethernet NIC of claim 14, wherein the multi-mode Ethernet NIC is further configured to:

detect, via AN pages transmitted from a 10GBASE-KR Ethernet link peer, that the Ethernet link peer supports one or more 802.3 Ethernet link types supported by the multi-mode Ethernet NIC; and complete auto-negotiation and link training with the 10GBASE-KR Ethernet link peer to initialize link operations with the 10GBASE-KR Ethernet link peer using 10GBASE-KR Ethernet signaling.

\* \* \* \* \*